UNITED STATES PATENT OFFICE.

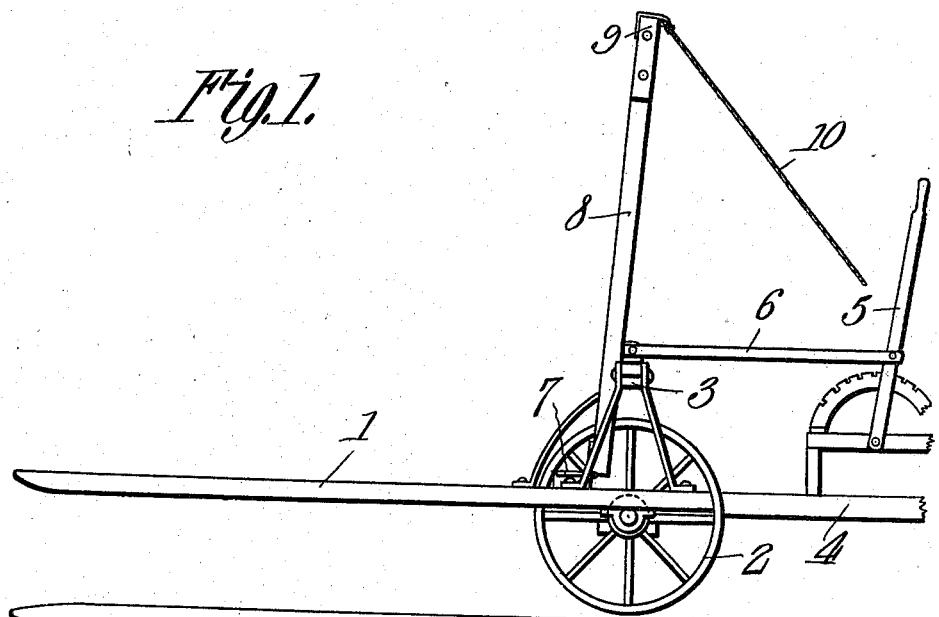
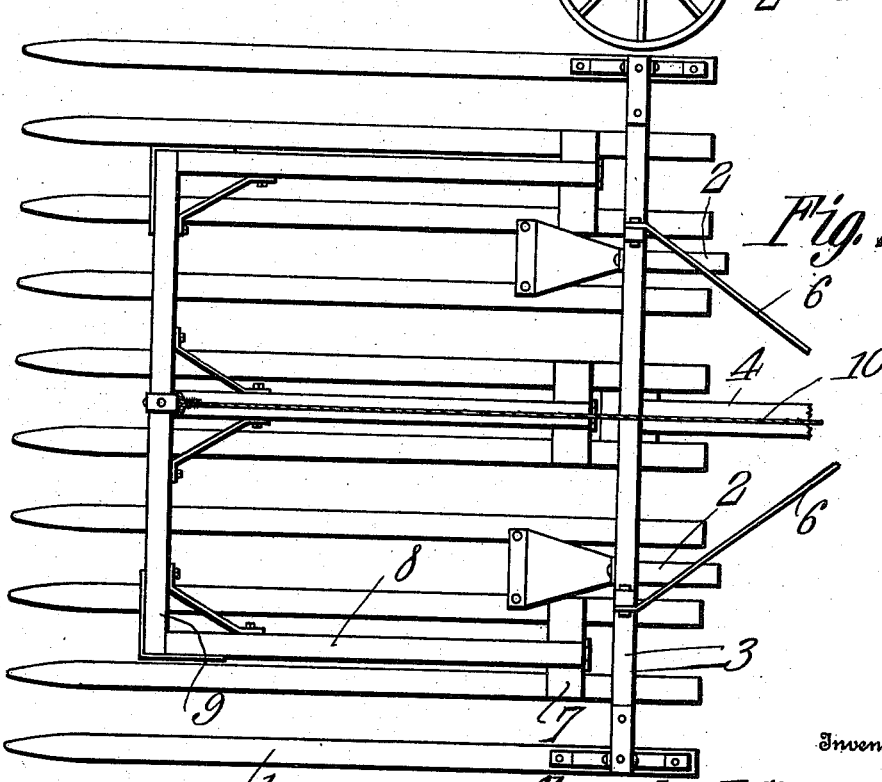

ALEXANDER F. CLARK AND ARTHUR JOHN CLARK, OF LEXINGTON, NEBRASKA.

SWEEP-RAKE ATTACHMENT.

963,991. Specification of Letters Patent. Patented July 12, 1910.

Application filed November 16, 1909. Serial No. 528,342.

*To all whom it may concern:*

Be it known that we, ALEXANDER F. CLARK and ARTHUR JOHN CLARK, citizens of the United States, residing at Lexington, in the county of Dawson, State of Nebraska, have invented a new and useful Sweep-Rake Attachment, of which the following is a specification.

This invention has relation to attachments for sweep rakes and it consists in the novel construction and arrangement of its parts as hereinafter shown and described.

The object of the invention is to provide an attachment for the character of rakes indicated which is adapted to be used upon such rakes when employed for collecting or gathering alfalfa hay. The principal function to be performed by the attachment is that it serves as a bucking device when the rake is delivering its load, thus preventing the hay from falling back upon the tines of the rake as for instance, when it is being delivered to the fork of a stacker.

Another function to be performed by the attachment is that it serves as a barrier for holding the hay upon the rake while the load is being accumulated and transported.

The attachment includes blocks which are adapted to be attached to the upper surfaces of the rake tines in the vicinity of the cross frame, and uprights hingedly attached to the said blocks and connected together at their upper or free ends by the cross bar. A cable is attached to the cross bar and is adapted to be used to swing the uprights and cross bar from a prostrate position upon the tines back against the cross frame of the rake structure.

In the accompanying drawing Figure 1 is a side elevation of the sweep rake with the attachment applied thereto. Fig. 2 is a top plan view of the same.

As illustrated in the accompanying drawing the sweep rake includes tines 1 mounted upon supporting wheels 2 and connected together by a cross frame 3. A beam 4 extends rearwardly from the frame 3 and is provided with a lever 5 which is operatively connected with the upper portion of the frame 3 by means of a bar 6. The structure hereto described is that of an ordinary sweep rake and it is thought unnecessary to go into further details to bring out the structure of the rake in order to explain the function and operation of the attachment.

The attachment includes blocks 7 which are adapted to be secured to the upper surfaces of the tines 1 swung in the vicinity of the cross plane 3. Uprights 8 are hingedly attached at their lower ends to the blocks 7 and the upper ends of the said uprights are connected together by a cross bar 9. One end of a cable 10 is attached to the cross bar 9 and the other end of the said cable extends back along the beam 4 to a point within convenient reach of the operator who is usually seated upon the rear portion of the said beam.

When the rake is accumulating a load of hay the uprights 8 are swung into the position indicated in Fig. 1 by pulling in the cable 10. It is of course understood that while the tines 1 are gathering the hay the lever 5 is so swung that the pointed ends of the said tines are in close proximity to the surface of the ground. As the hay collects upon the tines 1 it banks against the forward surfaces of the uprights 8 and the said uprights prevent the hay from falling back upon the beam 4 and the rear portion of the wheel 2. When a load of hay has been gathered as indicated, the lever 5 is swung into the position as shown in Fig. 1 whereby the pointed ends of the tines 1 are elevated with relation to the surface of the ground. The rake structure is then pushed to a stacker or to any desired point in the usual manner. When the rake arrives at the point where the hay is to be delivered the operator throws the upper end of the lever 5 in a forward direction with a quick movement which causes the pointed ends of the tines 1 to descend toward the surface of the ground and at the same time the cross frame 3 will force the upper end of the uprights 8 in a forward direction and the cross bar 9 will rest upon the rear portion of the load of hay. Then as the rake structure is backed (in the usual manner) the cross bar 9 will continue to rest upon the hay and its weight together with the weight of the uprights 8 will prevent the hay from falling back upon the tines 1 as it is picked up by the fork of a stacker or is slipped from the tines 1 onto the surface of the ground. After the load of hay has been deposited as indicated the lever 5 is swung into the position as shown in Fig. 1 when the pointed ends of the tines 1 are elevated and the rake may be readily transported to any point preparatory to collecting another load of hay.

Having thus described our invention what we claim as new and desire to secure by Letters-Patent is:

1. A sweep rake comprising tines, an elevated cross frame located upon the tines, a structure hingedly mounted upon the tines in the vicinity of the cross frame and which is limited in its swinging movement by said tines and said cross frame.

2. A sweep rake comprising tines, an elevated cross frame located upon the tines, a structure hingedly mounted upon the tines in the vicinity of the cross frame and limited in its swinging movement by said tines and said cross frame, and a cable attached to the free portion of said structure and adapted to extend back over the cross frame.

3. A sweep rake comprising tines, an elevated cross frame located upon the tines, blocks attached to the tines in the vicinity of the cross frame, and a structure hingedly mounted upon the blocks and limited in its swinging movement by the tines and cross frame.

4. A sweep rake comprising tines, an elevated cross frame located upon the tines, blocks attached to the tines in the vicinity of the cross frame, uprights hingedly connected with said blocks and limited in their swinging movement by the tines and cross frame, and a cross bar connecting the free ends of said uprights together.

5. A sweep rake comprising tines, an elevated cross frame located upon the tines, blocks attached to the tines in the vicinity of the cross frame, uprights hingedly connected to the blocks and limited in their swinging movement by the tines and cross frame, a cross bar connecting the free ends of said uprights together, and a cable connected at one end to the cross bar and adapted to extend back over the cross frame.

In testimony that we claim the foregoing as our own, we have hereto affixed our signatures in the presence of two witnesses.

ALEXANDER F. CLARK.
ARTHUR JOHN CLARK.

Witnesses:
J. J. OLSSON,
EDWARD HILL.